US011415704B2

(12) United States Patent
Hayes et al.

(10) Patent No.: US 11,415,704 B2
(45) Date of Patent: Aug. 16, 2022

(54) OPTIMIZED POSITION INFORMATION ASSISTED BEAMFORMING

(71) Applicant: SMARTSKY NETWORKS LLC, Morrisville, NC (US)

(72) Inventors: Gerard James Hayes, Wake Forest, NC (US); Koichiro Takamizawa, Silver Spring, MD (US); Douglas Hyslop, Vienna, VA (US)

(73) Assignee: SMARTSKY NETWORKS, LLC, Morrisville, NC (US)

( * ) Notice: Subject to any disclaimer, the term of this patent is extended or adjusted under 35 U.S.C. 154(b) by 57 days.

(21) Appl. No.: 16/975,813

(22) PCT Filed: Feb. 21, 2019

(86) PCT No.: PCT/US2019/018934
§ 371 (c)(1),
(2) Date: Aug. 26, 2020

(87) PCT Pub. No.: WO2019/165057
PCT Pub. Date: Aug. 29, 2019

(65) Prior Publication Data
US 2020/0408923 A1 Dec. 31, 2020

Related U.S. Application Data

(60) Provisional application No. 62/634,964, filed on Feb. 26, 2018.

(51) Int. Cl.
*G01S 19/22* (2010.01)
*G01S 19/39* (2010.01)
(Continued)

(52) U.S. Cl.
CPC ............. *G01S 19/22* (2013.01); *G01S 19/36* (2013.01); *G01S 19/396* (2019.08); *H04B 7/18506* (2013.01)

(58) Field of Classification Search
CPC ........ G01S 19/22; G01S 19/396; G01S 19/36; H04B 7/18506
(Continued)

(56) References Cited

U.S. PATENT DOCUMENTS 4,894,662 A  1/1990 Counselman
5,808,582 A  9/1998 Woo
(Continued)

FOREIGN PATENT DOCUMENTS

CN  105594223 A    5/2016
EP  2717070 A2     4/2014
EP  3869233 A1 *  8/2021  ............. G01S 19/22

OTHER PUBLICATIONS

International Search Report and Written Opinion of international application No. PCT/US2019/018934 dated Jul. 19, 2019, all enclosed pages cited.
(Continued)

Primary Examiner — Harry K Liu
(74) Attorney, Agent, or Firm — Burr & Forman, LLP

(57) ABSTRACT

A global positioning system (GPS) receiver may include an antenna configured to receive GPS signals from GPS satellites, a radio frequency (RF) front end configured to pre-process signals received by the antenna, a demodulator/converter configured to perform demodulation and analog-to-digital conversion of output signals received from the RF front end, a clock configured to provide a consistent clock signal, and a digital signal processor configured to receive the clock signal and make time and code measurements associated with determining a location of the GPS receiver based on the signals received by the antenna. The GPS receiver may be configured to eliminate reflected or indirect signals from the time and code measurements.

17 Claims, 8 Drawing Sheets

(51) Int. Cl.
*G01S 19/36* (2010.01)
*H04B 7/185* (2006.01)
(58) Field of Classification Search
USPC .................................................. 342/357.61
See application file for complete search history.

(56) References Cited

U.S. PATENT DOCUMENTS

| | | |
|---|---|---|
| 6,784,831 B1 | 8/2004 | Wang et al. |
| 8,432,310 B1 * | 4/2013 | Pogemiller ............. G01S 19/39 |
| | | 342/357.25 |
| 9,651,679 B1 * | 5/2017 | Tollefson ................ G01S 19/53 |

OTHER PUBLICATIONS

Office Action from Chinese Application No. 201980016915.2 dated Dec. 31, 2021, all pages cited in its entirety.

* cited by examiner

OPTIMIZED POSITION INFORMATION ASSISTED BEAMFORMING

CROSS REFERENCE TO RELATED APPLICATION

This application claims priority to U.S. application No. 62/634,964 filed Feb. 26, 2018, the entire contents of which are hereby incorporated by reference in its entirety.

TECHNICAL FIELD

Example embodiments generally relate to wireless communications and, more particularly, relate to enabling the use of optimized global positioning system (GPS) position information to guide the direction of steerable antenna beams to facilitate wireless communication in an air-to-ground (ATG) communication network.

BACKGROUND

High speed data communications and the devices that enable such communications have become ubiquitous in modern society. These devices make many users capable of maintaining nearly continuous connectivity to the Internet and other communication networks. Although these high speed data connections are available through telephone lines, cable modems or other such devices that have a physical wired connection, wireless connections have revolutionized our ability to stay connected without sacrificing mobility.

However, in spite of the familiarity that people have with remaining continuously connected to networks while on the ground, people generally understand that easy and/or cheap connectivity will tend to stop once an aircraft is boarded. Aviation platforms have still not become easily and cheaply connected to communication networks, at least for the passengers onboard. Attempts to stay connected in the air are typically costly and have bandwidth limitations or high latency problems. Moreover, passengers willing to deal with the expense and issues presented by aircraft communication capabilities are often limited to very specific communication modes that are supported by the rigid communication architecture provided on the aircraft.

Conventional ground based communication systems have been developed and matured over the past couple of decades. While advances continue to be made in relation to ground based communication, and one might expect that some of those advances may also be applicable to communication with aviation platforms, the fact that conventional ground based communication involves a two dimensional coverage paradigm and that air-to-ground (ATG) communication is a three dimensional problem means that there is not a direct correlation between the two environments. Instead, many additional factors must be considered in the context of ATG relative to those considered in relation to ground based communication.

BRIEF SUMMARY OF SOME EXAMPLES

Some example embodiments may therefore be provided to enhance the ability of communication nodes to determine their position in difficult environments. The improved ability to determine position may then contribute, for example to employing beamforming technology to communicate more efficiently and reliably.

In one example embodiment, a beamforming control module is provided. The beamforming control module may include processing circuitry configured to receive fixed position information indicative of a fixed geographic location of a base station, and receive dynamic position information indicative of a three dimensional position of a mobile communication station on an aircraft. The dynamic position information may be received from a GPS receiver disposed on the aircraft. The processing circuitry may be further configured to provide instructions to direct formation of a beam from an antenna array either to or from the aircraft based on the dynamic position information. The dynamic position information may be generated responsive to the GPS receiver eliminating reflected or indirect signals GPS receiver calculations.

In another example embodiment, an GPS receiver is provided. The GPS receiver may include an antenna configured to receive GPS signals from GPS satellites, a radio frequency (RF) front end configured to pre-process signals received by the antenna, a demodulator/converter configured to perform demodulation and analog-to-digital conversion of output signals received from the RF front end, a clock configured to provide a consistent clock signal, and a digital signal processor configured to receive the clock signal and make time and code measurements associated with determining a location of the GPS receiver based on the signals received by the antenna. The GPS receiver may be configured to eliminate reflected or indirect signals from the time and code measurements.

In another example embodiment, a method of improving GPS position determination is provided. The method may include determining an antenna pattern of an antenna configured to receive GPS signals, determining a current location of a GPS receiver comprising the antenna, performing signal selection based on the current location, adjusting the antenna pattern based on the signal selection to receive a selected set of signals, and performing GPS position determination based on the selected set of signals.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
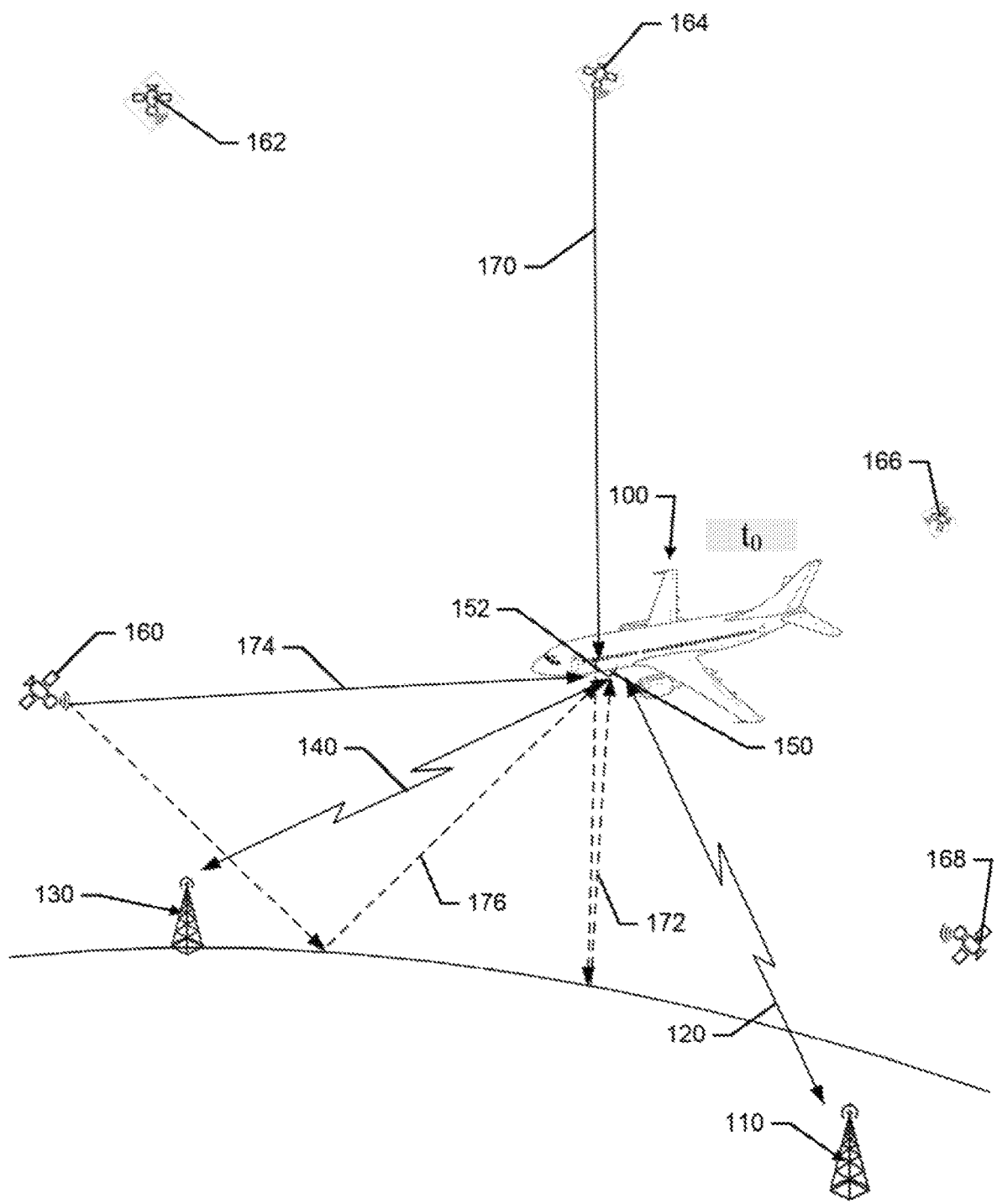
FIG. 1 illustrates an aircraft moving between the coverage areas of different base stations while receiving signals from GPS satellites in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, the terms "data," "content," "information" and similar terms may be used interchangeably to refer to data capable of being transmitted, received and/or stored in accordance with example embodiments. As used herein, a "steerable beam" should be understood to be a beam that, once formed, can be deflected or steered to a desirable direction, or a series of beams that are relatively fixed in direction and that can be sequentially formed in their respective fixed directions to track the movement of an aircraft such that the aircraft is effectively tracked by a "steered" beam that in reality is generated by a series of beam handovers between the sequentially formed fixed beams. The formation of either of these types of steerable beams is generally accomplished via "beamforming." Thus, use of any such terms should not be taken to limit the spirit and scope of example embodiments.

Typical wireless communication systems include end-user devices, which may be used at a particular location or in a mobile setting, and a fixed set of equipment with access to interconnection to the Internet and/or the Public Switched Telephone Network (PSTN). The end user device communicates wirelessly with the fixed equipment, referred to as the base station.

In some embodiments, a base station employing beamforming may employ an antenna array to generate beams in the direction of the target device, enhancing the coverage range when the location of the device is known to the base station. This paradigm may be particularly useful in an air-to-ground (ATG) network, where aircraft can be relatively large distances away from the base stations on the ground. However, the employment of beamforming in an ATG context essentially becomes practical only when the location of the aircraft is known to the base stations (and vice versa), so that highly directive, long range beams can be accurately formed or steered in the appropriate direction to reach and track the desired target. When the location of a target device is not known, then a beam may not be effectively formed in the direction of the target. In this case where beamforming is not present, the coverage range to the base station is reduced. The wireless system must be designed to provide for the lowest common denominator. If a device accessing the system for the first time has a less favorable coverage range, then the base stations must be placed closer together to ensure the unknown devices may gain access to the system. Placing the base stations closer together increases the network cost. Accordingly, it can be appreciated that knowing the location of the target, with accuracy, is a very important aspect of providing an effective and efficient ATG network.

If a wireless device has not yet been in contact with the base station, then the device may end up with insufficient coverage margin to communicate with the base station because the beamforming gain is not present. Therefore, the initial synchronization of the wireless device with the base station is a potential problem in a wireless system employing beamforming. To address this potential problem, it may be possible to utilize position information of receiving stations and base stations to facilitate beamforming at either or both ends of the wireless communication links that are to be established.

In an ATG communications system, the end-user equipment (or receiving stations) may be installed or otherwise present on an airplane or other aerial platform. Thus, as mentioned above, the utilization of position information may not simply involve knowledge of latitude and longitude, relative positioning, and/or the like. Instead, knowledge of three dimensional (3D) position information including altitude may be required. Moreover, in some cases, not only knowledge of the position of the aircraft at the current time, but also knowledge of the position of the aircraft at some future time may also be useful to assist beamforming. If the aircraft or end-user equipment is installed with a GPS device or other means of tracking location, speed, and altitude, then this location-specific information may be employed by the wireless system to enhance the initial synchronization coverage range by enhancing beamforming. For example, a wireless device on an aircraft may be aware of its location in the three-dimensional airspace, and/or make other devices aware of its location in 3D airspace. From that information, various devices may be enabled to derive knowledge of the bearing and airspeed of the airplane to not only accurately steer or form a beam in the direction of the aircraft, but anticipate future aircraft locations and form beams predictively to facilitate handoffs, etc.

GPS antennas are typically provided on the top of aircraft in order to enable the aircraft to have a direct view of as many GPS satellites as possible to improve accuracy of the GPS information. However, the antennas used for the ATG communications system may be desirably located on the bottom of the aircraft so that the aircraft fuselage or wings do not block ATG signals. In order to maximize efficiency and reduce complexity, it may be desirable to collocate the ATG antennas on the aircraft side along with the GPS antenna. This collocation may, however, put the GPS antenna in a location that creates undesirable side effects relative to the ability of the GPS antenna to have a direct view of GPS satellites. In particular, if there is a GPS satellite directly above the aircraft, that GPS antenna (which may otherwise provide the strongest signal) may actually not be receivable, or may only be received via an indirect path (i.e., after bouncing or reflecting off the ground). Given the basic principles of GPS operation, the indirect path can obviously be quite problematic. Example embodiments may enable the optimization of GPS location information within this context, or any other context where GPS signals are impacted by interference from reflected signals in a predictable way.

Prior to understanding how to optimize GPS location in an ATG network, it may be useful to appreciate how GPS location information is used in the ATG network. In some cases, it may be desirable to store the wireless network base station configuration in reconfigurable memory (e.g., a database). A device on an aircraft and wishing to communicate using network assets, and the network assets themselves may, with knowledge of the aircraft's location and heading, assess the best-serving base station from this database and direct initial access requests toward the expected best-serving base station. This may enable beamforming to be used in either or both of the forward link (from the ground to the aircraft) and the reverse link (from the aircraft to the ground) upon initial system access/synchronization. In some embodiments, the wireless system may employ assets to actively track all devices (e.g., all aircraft or other receiving devices on the aircraft in the 3D airspace. As an example, airplanes (or devices thereon) taking off from an airport may access and synchronize with a base station near the airport. Once known to the wireless system, the aircraft (or one or more of the devices thereon) may periodically transmit position information (e.g., coordinates, altitude, and speed) to the serving base station. The serving base station may share the position information with a centralized server or other device in the core network, or with a distributed network of devices connected to the core network. The centralized server (or other processing devices including distributed devices) may then track each aircraft, compare the aircraft location(s) against a database of base stations in the system, and provide information to the base stations and/or devices on the aircraft to enable directional beams to be formed or steered to facilitate wireless communication. The centeralized server (or other processing devices) may also determine when a particular aircraft may be moving toward or into a different base station's coverage area. The aircraft location may be shared with the new base station, and the new base station may then form a directional or steerable beam toward the wireless device to share synchronization information and facilitate handover and continued connection for the aircraft (or devices thereon).

Example embodiments may therefore combine knowledge of fixed base stations positions (e.g., in 2D or 3D) with knowledge of moving receiving station or aircraft positions (e.g., in 3D—or 4D if time is also considered—or 5D if future time is also considered) to provide beamforming from either or both of the airplane (or devices thereon) and the base station when the devices on the aircraft have not yet acquired a neighboring base station. Full beamforming coverage benefits may therefore be maintained within an ATG system, reducing the cost of network coverage and improving handoff reliability. The improved gain by using directed beams may enable aircraft to engage in communications with potentially distant base stations on the ground. Accordingly, an ATG network may potentially be built with base stations that are much farther apart than the typical distance between base stations in a terrestrial network and the cost of the network may be reduced without sacrificing performance.

FIG. 1 illustrates a conceptual view of an aircraft 100 moving through a coverage zone of different base stations of an ATG network to illustrate an example embodiment. Of note, FIG. 1 is not drawn to scale. As can be seen in FIG. 1, the aircraft 100 may be in communication with a first base station (BS) 110 at time to via a first wireless communication link 120. The first wireless communication link 120 includes both the forward and reverse links described above. At least the forward link may employ beamforming, and in some cases, the reverse link may also employ beamforming. The aircraft 100 may include wireless communication equipment or devices onboard that may enable the aircraft 100 (or devices thereon) to communicate with the first BS 110, and the first BS 110 may also include wireless communication equipment enabling communication with the aircraft 100 (or devices thereon). As will be discussed in greater detail below, the wireless communication equipment at each end may include radio hardware and/or software for processing wireless signals received at corresponding antenna arrays that are provided at each respective device in communication with their respective radios. Moreover, the wireless communication equipment of example embodiments may be configured to employ beamforming techniques to utilize directive focusing, steering, and/or formation of beams using the antenna arrays. Accordingly, for the purposes of this discussion, it should be assumed that the wireless communication link 120 between the aircraft 100 and the first BS 110 may be formed using at least one link established via beamforming. In other words, either the first BS 110 or the aircraft 100, or both, may include radio control circuitry capable of employing beamforming techniques for establishment of the wireless communication link 120.

The first BS 110 has a fixed position geographically and therefore position information regarding the location of the first BS 110 can be known. In some cases, an estimate of the coverage area defining the region in which first BS 110 is capable of providing wireless connectivity to aircraft may also be known or estimable (e.g., at the aircraft 100 and/or at the first BS 110 or at a centralized node or server). Meanwhile, the position of the aircraft 100 in 3D space may also be known or estimable at any given time (e.g., at the aircraft 100 and/or at the first BS 110). Furthermore, it should be appreciated that the coverage area of the first BS 110 may possibly be altitude dependent, in some cases. In this regard, for example, the latitudinal and longitudinal coverage area projected onto the surface of the earth for the first BS 110 may be differently sized for different altitudes. Accordingly, for example, based on the known position and coverage characteristics of the first BS 110 and the position information of the aircraft 100 at time to, it may be determinable that the aircraft 100 is nearing or at the edge of the coverage area of the first BS 110 at time to.

A second BS 130, which may have similar performance and also have similar physical and/or functional characteristics to those of the first BS 110, may be located geographically such that, for the current track of the aircraft 100, the second BS 130 is a candidate for handover of the aircraft 100 to maintain a continuous and uninterrupted communication link between the aircraft 100 and ground-based base stations of an ATG wireless communication network at time to. As discussed above, it may be helpful for the second BS 130 to be aware of the approach of the aircraft 100 so that the second BS 130 can employ beamforming techniques to direct a beam toward the aircraft 100. Additionally or alternatively, it may be helpful for the aircraft 100 to be aware of the existence and location of the second BS 130 so that the wireless communication equipment on the aircraft 100 may employ beamforming techniques to direct a beam toward the second BS 130. Thus, at least one of the second BS 130 or the wireless communication equipment on the aircraft 100 may employ beamforming techniques assisted by knowledge of position information to facilitate establishment of a second wireless communication link 140 between the wireless communication equipment on the aircraft 100 and the second BS 130. The second wireless communication link 140 may be established substantially at or after time to, and may include a forward link and reverse link as described above.

In accordance with an example embodiment, a beamforming control module may be provided at the first BS 110, the second BS 130, a network location capable of communication with the first and second BSs 110 and 130, and/or at the aircraft 100. The beamforming control module may, for example, employ 2D knowledge of fixed base station location and/or 3D knowledge of position information regarding a receiving station on the aircraft 100 (either in current or future time) to determine relative positions therebetween and assist in application of beamforming techniques based on the relative positions determined. However, as stated above, the accuracy of the position information may depend upon the ability to determine accurate GPS location information on the aircraft 100.

The aircraft 100 may include one or more instances of an antenna assembly 150 that includes an antenna or antennas configured or configurable for communicating in the ATG network. For communication in the ATG network, as mentioned above, the antenna assembly 150 may be positioned on a bottom portion of the fuselage of the aircraft 100 to facilitate a view of the ground from horizon to horizon so that the first and second BSs 110 and 130 of the ATG network (and any other BSs of the ATG network that are in range) are capable of communicating with the antenna assembly 150. Thus, the antenna assembly 150 may have a relatively unobstructed view of potential BSs of the ATG network for any attitude and altitude of the aircraft 100.

As shown in FIG. 1, the aircraft 100 may also be capable of determining its location via communication with GPS satellites that are visible to the aircraft 100. Collocated with the antenna assembly 150, as part of the antenna assembly 150, or located nearby the antenna assembly 150, the aircraft 100 may also include a GPS receiver 152 that may be capable of determining the position of the aircraft 100 based on interaction with the GPS satellites. The operation of the GPS satellites with the GPS receiver 152 to determine an accurate position of the GPS receiver 152 is generally well known. In this regard, the GPS satellites are formed into a constellation of satellites (e.g., 24 to 32 satellites) that orbit the earth. The satellites each broadcast signals that include precise orbital data, and the orbits of the satellites are also closely observed and monitored. The orbital data that is transmitted may include ephemeris data and can be used to calculate the position of the satellite and the precise time that the signal was transmitted. The orbital data (including ephemeris data) may be transmitted in a message that is superimposed on a code that serves as the timing reference. The timing associated with broadcasting of three or more signals (from three or four corresponding satellites) may then be used to measure time-of-flight to each respective satellite. A continual fix generation algorithm may then run to use an adapted version of trilateration to the satellites in order to determine the location of the GPS receiver 152.

In the example of FIG. 1, a number of GPS satellites 160, 162, 164, 166 and 168 may be visible to the aircraft 100. However, not all of those same satellites 160, 162, 164, 166 and 168 may be visible to the antenna assembly 150 (and therefore also to the GPS receiver 152). In this regard, satellite 164 may be positioned directly (or nearly directly) above the aircraft 100 such that the fuselage and/or wings of the aircraft 100 may shield a transmitted signal 170 that originates at the satellite 164 may be shielded from arrival at the GPS receiver 152. However, the transmitted signal 170 may bounce off the surface of the earth and return to the GPS receiver 152 such that the GPS receiver 152 receives indirect signal 172. To the extent that both the transmitted signal 170 and the indirect signal 172 are each received at the GPS receiver 152, the transmitted signal 170 may be significantly attenuated and therefore have a much lower signal strength relative to the indirect signal 172.

Meanwhile, unobstructed transmitted signals 174 may be received at the GPS receiver 152 directly from respective ones of the satellites 160, 162, 166 and 168, and any indirect signals 176 from these satellites 160, 162, 166 and 168 could reliably be expected to be weaker than the unobstructed transmitted signals 174. Thus, to the extent that the GPS receiver 152 is configured to select a strongest signal from each satellite for any position determination calculations, at least with respect to the transmitted signal and the indirect signal 172 from satellite 164, the stronger signal will be a signal that took a longer path to the GPS receiver 152 and therefore has incorrect timing and will not be able to be used in a convergent calculation for accurate position determination.

The satellites 160, 162, 166 and/or 168 may be used by the GPS receiver 152 to make position determination calculations indicative of a location of the GPS receiver 152 (and therefore also the aircraft 100) in 3D space. However, in some cases, the first BS 110 and second BS 130, along with any other BSs of the ATG network, may serve as fixed ground stations that can act as reference stations in an ATG-based differential GPS or assisted GPS system. Similar to differential GPS using terrestrial networks, the reference stations may calculate differential corrections for their own respective locations and for time, and the corrections may provide compensation for satellite ephemeris errors and errors introduced by ionospheric and tropospheric distortions. The corrections may be communicated to the aircraft 100 (and therefore also to the GPS receiver 152 on each respective aircraft 100 or on devices on the aircraft 100) to improve accuracy of the GPS positions that are calculated thereat.

In a typical context, the GPS satellite that is at a zenith above the GPS receiver may be expected to have the strongest GPS signal, since it is likely closest to the GPS receiver. However, in the ATG network context, a satellite (e.g., satellite 164) that is at a zenith relative to the GPS receiver 152, may actually end up being the worst signal to use since the signal is most likely to be received via an indirect path based on the shielding provided by the aircraft 100. How to handle complications associated with this unique problem to the ATG context therefore becomes an important aspect to enabling accurate beamforming and asset location determination that such beamforming requires.

As can be appreciated from the discussion above, in some cases, the GPS receiver 152 may be configured to use signals from satellites based on signal strength, and the indirect signal 172 from satellite 164 could actually be stronger than one or more (if not all) of the unobstructed transmitted signals 174 from the other satellites 160, 162, 166 and 168. Thus, in such a context, the GPS receiver 152 may be programmed to try to use the indirect signal 172 for position determination. In some cases, the GPS receiver 152 may be configured to eventually figure out that the indirect signal 172 is a problem that prevents convergence on a position determination, and may throw out the indirect signal 172. However, the delay in arriving at convergence (or in deciding that convergence will not happen) that is caused by repeated attempts to determine location using the indirect signal 172 and resulting non-convergent solutions may delay or otherwise negatively impact the accuracy of the GPS receiver 152 in making position determinations. Thus, it may be useful to be able to avoid using signals from satellites when a particular aircraft is likely to be at a nadir relative to a particular satellite, or when a particular aircraft is otherwise at a location relative to a particular satellite that is likely to cause delays or problems with convergence and accurate position determination due to the relative positioning between the satellite and the aircraft 100. In other words, it may be desirable to take preventive measures to avoid using indirect signals (172 and 176) from GPS satellites.

Figure 4:
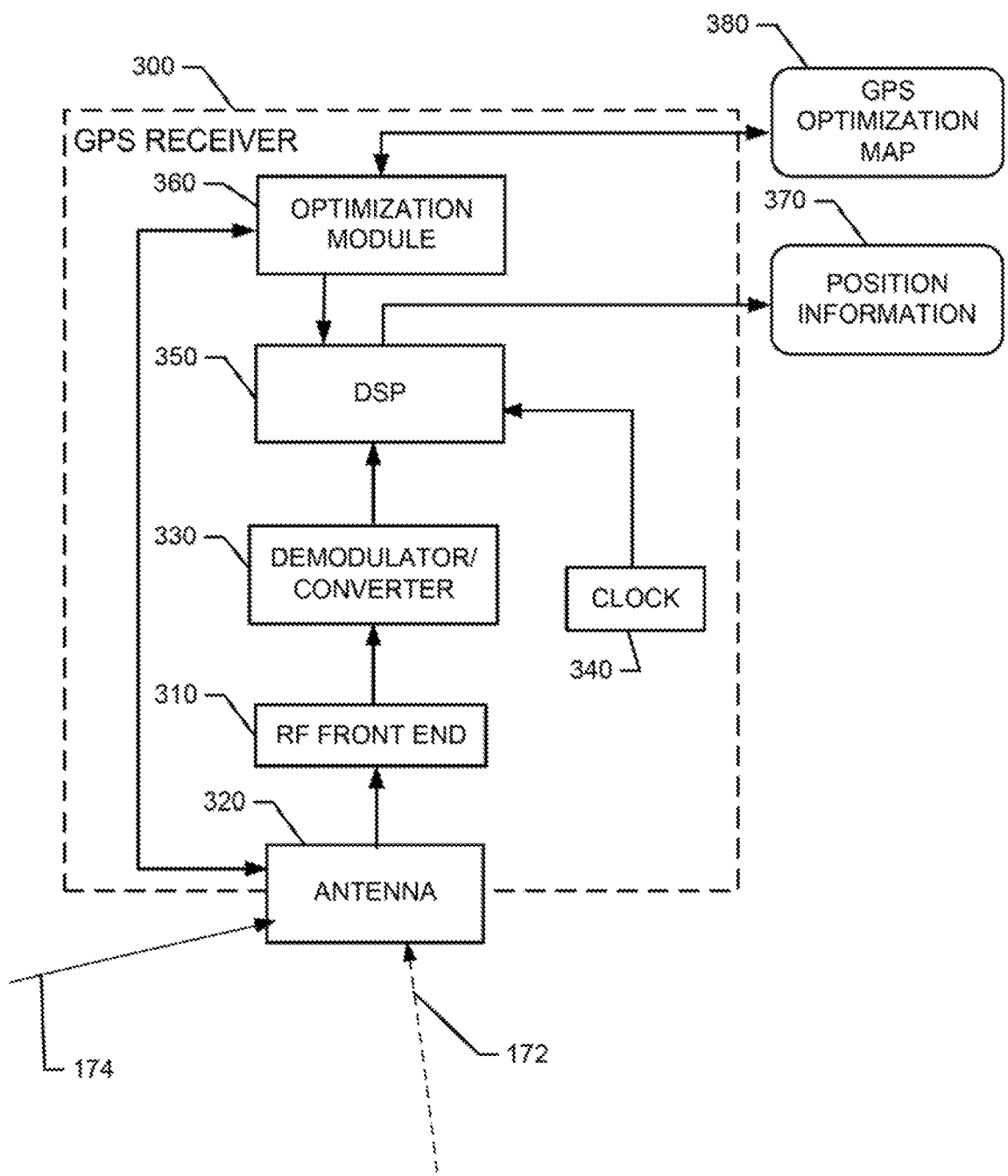
FIG. 4 illustrates a block diagram of a GPS receiver in accordance with another example embodiment.

The avoidance of using indirect signals from GPS satellites can be accomplished in a number of different ways including purely hardware solutions and numerical or programmed solutions. Thus, example embodiments may provide a GPS receiver that is configured to be GPS-optimized for an ATG context. Being GPS-optimized for the ATG context may include the GPS receiver employing antenna technologies that avoid usage of reflected signals (i.e., indirect signals). In this regard, FIGS. 2 and 4 illustrate some examples of different strategies for providing GPS-optimized receivers for the ATG context.

Figure 2:
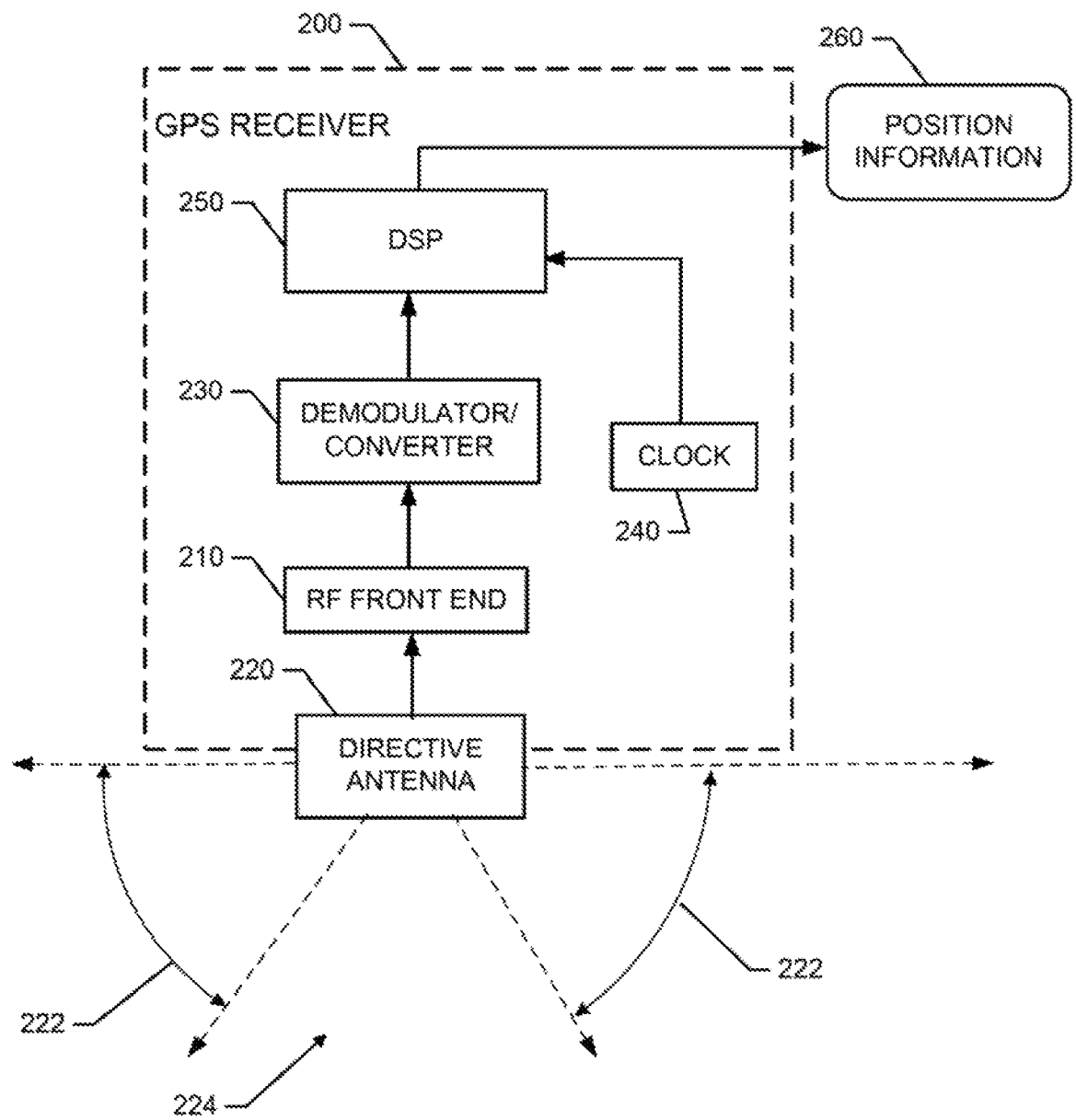
FIG. 2 illustrates a block diagram of a GPS receiver in accordance with an example embodiment.

FIG. 2 illustrates a functional block diagram of a GPS-optimized receivers for use in the ATG context that employs hardware configured rejection of signals that are likely to be indirect signals (e.g., indirect signals 172 and 176). In this regard, signals that are received at a nadir of the antenna aperture relative to the aircraft 100 are most likely to be instances of the indirect signal 172. The farther from the nadir that a signal moves, the less likely the signal is to be reflected or indirect. Thus, GPS receiver 200 includes an RF front end 210 that may include amplifiers and filters that are configured to pre-process signals received by directive antenna 220. An output of the RF front end 210 may be received at demodulator/converter 230, which may be configured to perform demodulation and analog-to-digital conversion of output signals received from the RF front end 210. A clock 240 may provide a consistent clock signal to a digital signal processor 250 that is configured to use time measurements and code measurements associated with signals received by the directive antenna 220 to perform such functions as data bit alignment, data parity checking, data decoding, range corrections, etc., to determine receiver position and velocity and perform any other needed time computations to allow position, velocity and time determinations (e.g., position information 260) to be made by the GPS receiver 200.

Figure 3:
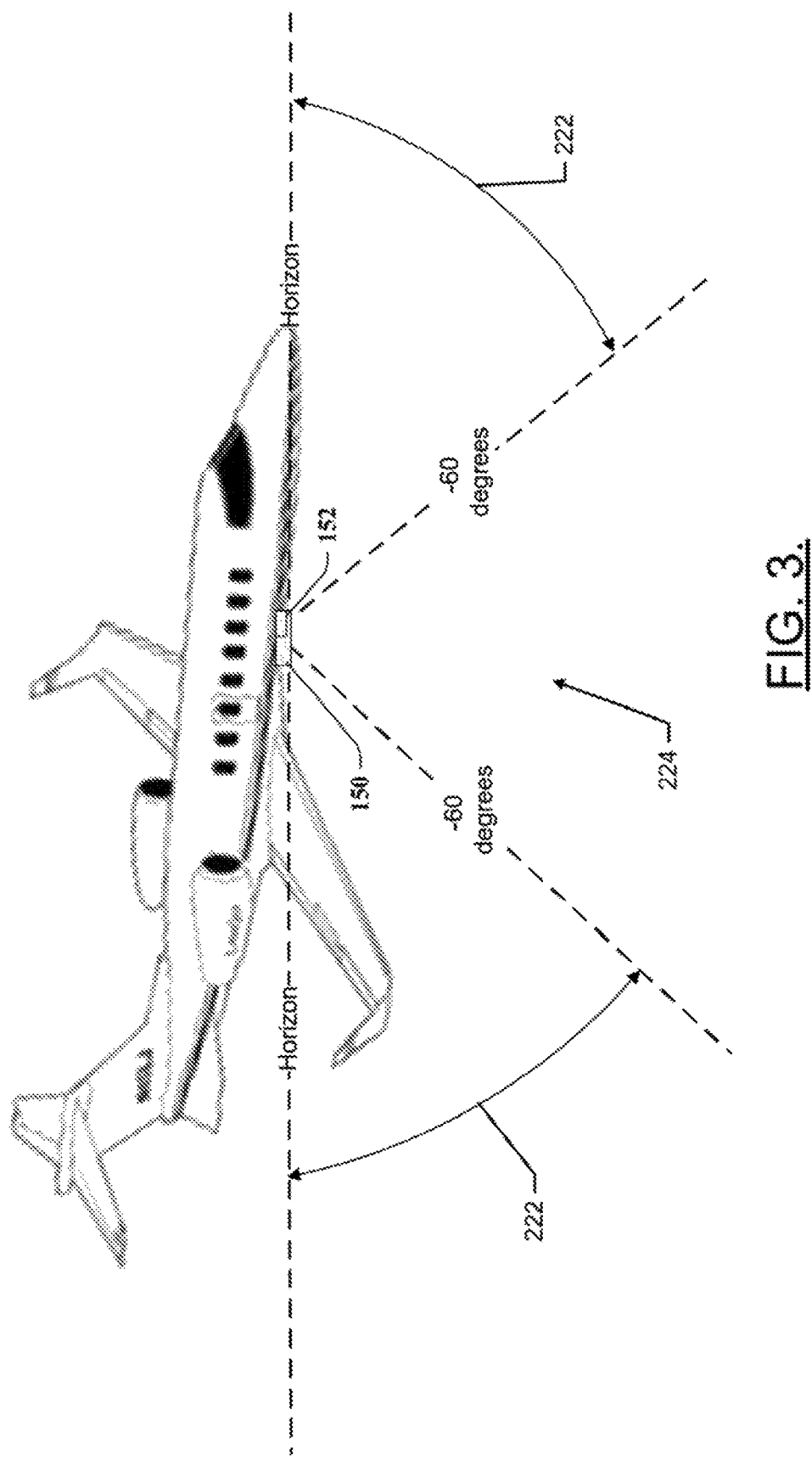
FIG. 3 illustrates a perspective view of the aircraft to demonstrate creation of a null at a nadir position below the aircraft according to an example embodiment.

The directive antenna 220 may be configured to ignore nadir signals and signals that are nearly nadir signals. In some cases, the directive antenna 220 may be an antenna that is configured to look primarily toward the horizon as shown in the example of FIG. 3. In this regard, the aircraft 100 of FIG. 3 includes the directive antenna 220 disposed at a bottom portion thereof, and the directive antenna 220 is configured to be side-looking (i.e., not upward or downward looking). In this regard, an approximated antenna receive aperture 222 for the directive antenna 220 is shown in FIG. 3. The approximated antenna receive aperture 222 for the directive antenna 220 of this example may be approximately 30 degrees from the nadir to approximately 90 degrees. In some examples, the directive antenna 220 may be embodied as a monopole or a dipole antenna that is configured to have a null 224 steered toward the ground (i.e., toward the nadir). The aircraft fuselage may serve as a ground plane, and the presence of the null that is provided at the nadir may result in a donut shaped antenna aperture that is steered toward the horizon in all directions about the aircraft 100. Thus, GPS satellites that are closer to the horizon relative to the aircraft 100 will not only preferentially be used for GPS position determination, but will be the only signals that are received. The directive antenna 220 therefore serves as a mechanism by which to structurally avoid any receipt of signals that are likely to be reflected or indirect signals.

However, there are other ways to avoid indirect signals that may allow for optimization without fixed structures and that can therefore intelligently determine which signals to use and not use for calculations involving GPS position determinations. FIG. 4 illustrates a functional block diagram of one such structure. In this regard, a GPS receiver 300 according to this example embodiment may include an RF front end 310 that may be similar in form and/or function to the RF front end 210 of FIG. 2. The RF front end 310 may be configured to pre-process signals received by antenna 320, which need not be a directive antenna (at least not in a fixed configuration) as will be discussed in greater detail below. An output of the RF front end 310 may be received at demodulator/converter 330, which may be similar in form and/or function to the demodulator/converter 230 of FIG. 2 to perform demodulation and analog-to-digital conversion of output signals received from the RF front end 310. A clock 340 may provide a consistent clock signal to a digital signal processor 350 that is configured to interface with optimization module 360 and also use time measurements and code measurements associated with signals received by the antenna 320 to perform such functions as data bit alignment, data parity checking, data decoding, range corrections, etc., to determine receiver position and velocity and perform any other needed time computations to allow position, velocity and time determinations (e.g., position information 370) to be made by the GPS receiver 300. The optimization module 360 may be configured, for example, to provide optimization of GPS position determination by avoiding usage of indirect or reflected signals.

In one example embodiment, the antenna 320 may be a configurable antenna insofar as the antenna 320 may be able to generate directionally moveable nulls responsive to instructions provided by the optimization module 360. Thus, for example, the optimization module 360 may be configured to provide null steering instructions to the antenna 320 to configure the antenna 320 to steer a null toward the indirect signal 172, while allowing the antenna 320 to receive incoming signals such as the unobstructed transmitted signals 174. Null steering instructions may be generated to steer a null toward a particular area or sector (e.g., null steering toward a nadir region beneath the aircraft 100), or to steer a null toward a particular signal (or signals). For example, if a signal (regardless of location of origin) is found to be difficult to achieve convergence of an accurate determination of position information 370, the corresponding signal may have a null steered in its respective direction of origin. The optimization module 360 may therefore, using null steering, effectively exclude any signals that are problematic (e.g., due to being indirect signals, or signals that otherwise fail to achieve convergence on an accurate position information 370).

In order to perform null steering, or any other configuration of the antenna 320, some example embodiments may further provide that the optimization module 360 is configured to determine a current configuration or orientation of the antenna 320 to, for example, know where the antenna 320 is currently configured to receive signals, relatively speaking. Thus, the antenna pattern of the antenna 320 may be determinable by the optimization module 360. In some cases, certain parameters of the antenna pattern may be known a priori due to testing done on the antenna 320 before or after installation. Thus, baseline or default antenna pattern information may be known. Adjustments made to the baseline antenna pattern or configuration may then be tracked so that a current antenna pattern can be determined for any given time. The antenna pattern can therefore be adjusted (e.g., via null steering, beam formation, or other technologies that enable the antenna 320 to "look" in a particular direction(s) for signals in order to effectively perform GPS optimization based on antenna pattern.

As an alternative to null steering, in some embodiments, the optimization module 360 may be configured to selectively add or remove signals from satellites 160, 162, 164, 166 and 168. The selective addition or removal may be performed based on real time analysis of the accuracy and convergence times associated with calculation of the position information 370 for various sets of satellites in numerous possible combinations, or based on information received (e.g., from a network entity or another network asset) to indicate the usefulness or accuracy of signals from a particular satellite or in a particular location based on the experiences of other assets at the location. Thus, in some cases, the optimization module 360 may operate independently at the GPS receiver 152 purely based on the signals received and guidelines for processing such signals relative to expected results that are stored at the optimization module 360. However, in other examples, the optimization module 360 may also or alternatively receive information from other assets or entities within the ATG network to indicate that, in the general location of the aircraft 100, specific problems with signals from individual satellites, or from GPS in general, have been previously reported. The prior reporting may be determinable or assumed to be associated with a cause that is still applicable at the present time for the aircraft 100. For example, based on known satellite movement speeds, data may be considered applicable for a particular geographic area (or ATG cell(s)) for a limited time during (e.g., a blackout period) which a particular problematic satellite is located at a zenith relative to assets (e.g., aircraft) in the particular geographic area. After the blackout period, the particular problematic satellite may move out of the zenith position, so that indirect or reflected signal problems are no longer an issue for assets (e.g., the aircraft 100) in the corresponding particular geographic area.

In some cases, reporting by other assets on a geographically registered basis (i.e., each report of satellite performance being associated with a region in which the assets are located when the performance measurements are made) may effectively allow the ATG network to define a correlation between satellite performance (e.g., based on position and likelihood to generate indirect or reflected signals) and location that can be updated over time. As such, the optimization module 360 may be enabled to generate or consume data that effectively defines a GPS optimization map 380 of locations where specific positioning accuracy challenges are being faced or can be expected to be faced at a given time. As such, the optimization module 360 may reference the GPS optimization map 380 for use in instructing the digital signal processor 350 relative to calculation of position information 370. However, the optimization module 360 may also be used to take data on GPS signals received and process such data for use in generation of the GPS optimization map 380. The GPS optimization map 380 may then be shared with other ATG network assets (e.g., via wireless communication with such assets directly or with a central node or map distributor within the ATG network) and updated versions of the GPS optimization map 380 may be maintained at each respective asset for use by each respective GPS receiver 300. However, in some examples, a single instance of the GPS optimization map 380 may be maintained at the central node within the ATG network and each asset may communicate with the central node to get information from or provide information to the GPS optimization map 380.

The GPS optimization map 380 may indicate areas (and time ranges) where signals from specific satellites should be blocked, removed or ignored. Alternatively or additionally, the GPS optimization map 380 may indicate areas (and time ranges) where GPS positioning is compromised or inaccurate. In such situations, for example, assistance from BSs of the ATG network may be instructed to use ATG-based differential GPS or assisted GPS to improve position determination accuracy for the period of time that the aircraft 100 is in a location where GPS positioning is compromised or inaccurate. Thus, in some cases, the GPS optimization map 380 may incorporate information that effectively defines a predictive signal quality estimate (in graphical display format) for satellites that are likely to be visible to the aircraft 100 in each location. The predictive signal quality estimate may, in practice, effectively define a GPS satellite blacklist for satellites that should be avoided, or should not be used for position determination (if possible) in a given location and/or at a given period of time. As such, for example, if a specific satellite can be determined to be likely to generate indirect or reflected signals in corresponding specific geographic areas for a given period of time, the specific satellite may be removed from any calculations for position determination.

Figure 5:
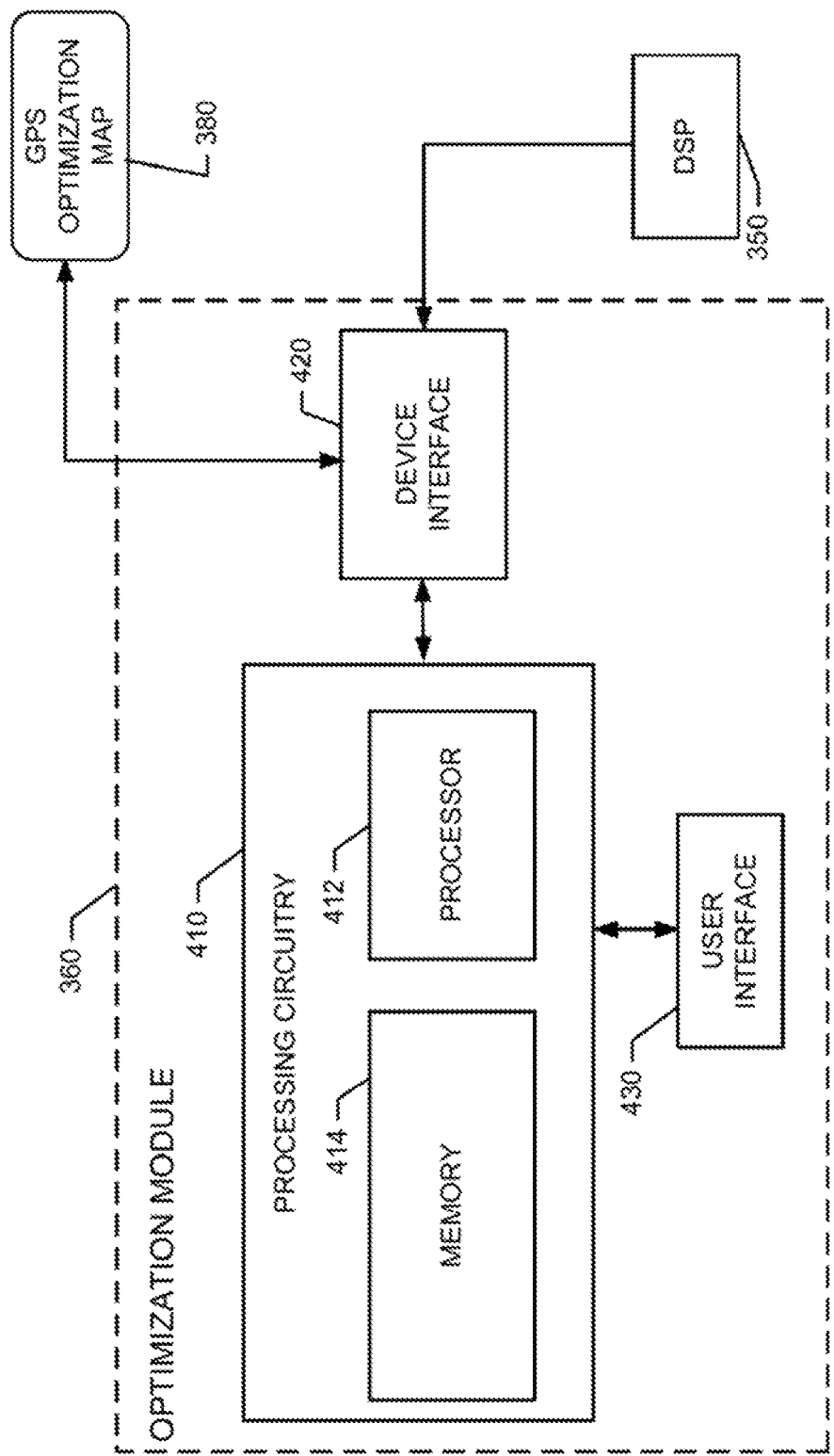
FIG. 5 illustrates a block diagram of an optimization module in accordance with an example embodiment.

FIG. 5 illustrates the architecture of a optimization module 360 in accordance with an example embodiment. It should be appreciated that an instance of the optimization module 360 (and the beamforming control module discussed below) may be provided at each aircraft and/or at any or all of the BSs of the ATG network. Additionally or alternatively, instances of the optimization module 360 (and the beamforming control module) may be embodied at one or more network entities on the ground. Each instance may be enabled to operate independently or in continuous or periodic communication with other instances. Thus, it should also be appreciated that the GPS optimization map 380 may be generated locally on the aircraft 100, or may be generated elsewhere and shared with the aircraft 100. The existence of the ATG network enables real time communication of any applicable data between entities for near real time processing and calculation of any of the determinations described herein.

The optimization module 360 may include processing circuitry 410 configured to provide control outputs for generation of instructions for the antenna 320 (e.g., relative to null formation) and/or for the digital signal processor 350 of the GPS receiver 300 to dictate selection of signals to include in calculation of the position information 370. The processing circuitry 410 may be configured to perform data processing, control function execution and/or other processing and management services according to an example embodiment of the present invention. In some embodiments, the processing circuitry 410 may be embodied as a chip or chip set. In other words, the processing circuitry 410 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 410 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 410 may include one or more instances of a processor 412 and memory 414 that may be in communication with or otherwise control a device interface 420 and, in some cases, a user interface 430. As such, the processing circuitry 410 may be embodied as a circuit chip (e.g., an integrated circuit chip) configured (e.g., with hardware, software or a combination of hardware and software) to perform operations described herein. However, in some embodiments, the processing circuitry 410 may be embodied as a portion of an on-board computer. In some embodiments, the processing circuitry 410 may communicate with various components, entities and/or sensors of the ATG network.

The user interface 430 (if implemented) may be in communication with the processing circuitry 410 to receive an indication of a user input at the user interface 430 and/or to provide an audible, visual, mechanical or other output to the user. As such, the user interface 430 may include, for example, a display, one or more levers, switches, indicator lights, buttons or keys (e.g., function buttons), and/or other input/output mechanisms.

The device interface 420 may include one or more interface mechanisms for enabling communication with other devices (e.g., modules, entities, sensors and/or other components of the ATG network or of the GPS receiver 200/300 or the aircraft 100). In some cases, the device interface 420 may be any means such as a device or circuitry embodied in either hardware, or a combination of hardware and software that is configured to receive and/or transmit data from/to modules, entities, sensors and/or other components of the ATG network that are in communication with the processing circuitry 410.

The processor 412 may be embodied in a number of different ways. For example, the processor 412 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 412 may be configured to execute instructions stored in the memory 414 or otherwise accessible to the processor 412. As such, whether configured by hardware or by a combination of hardware and software, the processor 412 may represent an entity (e.g., physically embodied in circuitry—in the form of processing circuitry 410) capable of performing operations according to embodiments of the present invention while configured accordingly. Thus, for example, when the processor 412 is embodied as an ASIC, FPGA or the like, the processor 412 may be specifically configured hardware for conducting the operations described herein. Alternatively, as another example, when the processor 412 is embodied as an executor of software instructions, the instructions may specifically configure the processor 412 to perform the operations described herein.

In an example embodiment, the processor 412 (or the processing circuitry 410) may be embodied as, include or otherwise control the operation of the optimization module 360 based on inputs received by the processing circuitry 410 responsive to receipt of GPS signals from the antenna 320. As such, in some embodiments, the processor 412 (or the processing circuitry 410) may be said to cause each of the operations described in connection with the optimization module 360 in relation to adjustments to be made to operation of the antenna 320 and/or the digital signal processor 350 of the GPS receiver 300 with respect to null generation, signal selection or rejection, calculating the position information 370 and/or interaction with the GPS optimization map 380 to undertake the corresponding functionalities relating to interaction with the satellites 160, 162, 164, 166 and 168 responsive to execution of instructions or algorithms configuring the processor 412 (or processing circuitry 410) accordingly.

In an exemplary embodiment, the memory 414 may include one or more non-transitory memory devices such as, for example, volatile and/or non-volatile memory that may be either fixed or removable. The memory 414 may be configured to store information, data, applications, instructions or the like for enabling the processing circuitry 410 to carry out various functions in accordance with exemplary embodiments of the present invention. For example, the memory 414 could be configured to buffer input data for processing by the processor 412. Additionally or alternatively, the memory 414 could be configured to store instructions for execution by the processor 412. As yet another alternative, the memory 414 may include one or more databases that may store a variety of data sets responsive to GPS signal reception and/or interaction with the GPS optimization map 380. Among the contents of the memory 414, applications and/or instructions may be stored for execution by the processor 412 in order to carry out the functionality associated with each respective application/instruction. In some cases, the applications may include instructions for providing inputs to control operation of the optimization module 360 as described herein.

In an example embodiment, the memory 314 may store the GPS optimization map 380 or portions thereof. Alternatively or additionally, the memory 314 may store instructions for operation of the antenna 320 to generate nulls or select signals based on various rules or triggers defined in the instructions. For example, the memory 314 may store instructions that define a number of cycles or a period of time in which, if convergence on an accurate position fix is not achieved using a given set of satellites (e.g., 3, 4 or 5 signals from respective satellites that are visible to the GPS receiver 152), one of the satellites of the group must be considered to be inaccurate (e.g., due to providing indirect or reflected signals). The memory 314 may further store instructions for defining additional sets including various combinations of signals from respective different satellites in order to determine whether sets including one (or more) of the satellites tend to be non-convergent or unable to determine accurate position information 370. If one (or more) of the satellites 160, 162, 164, 166 and 168 is (are) determined to be inaccurate, such information may be used for generation or updating of the GPS optimization map 380. The corresponding signals may then be blocked or removed from future calculations by this GPS receiver 300 and/or by other GPS receivers in the ATG network via the GPS optimization map 380. Data sets may therefore be stored and/or shared that indicate signals received at various locations (e.g., ATG cells or more specific locations (e.g., lat/long/altitude)) and a qualitative assessment of the fixes and/or signals associated with determining the position information 370. For example, each fix calculation attempted may be associated with a time, location, signal quality, fix quality and/or the like for the group of satellites used for the fix calculation. In some cases, multiple fix calculations with low quality all having a common satellite, while other calculations exclude the common satellite and have a higher quality may be used to indicate that the common satellite is likely generating indirect or reflected signals. The corresponding fixes, or the individual signals from that satellite, may be marked or otherwise considered to be low quality and excluded from usage for at least a predetermined period of time. The determination made may also be reported (via the ATG network) so that other assets can be made aware of the determination and so that, for example, the GPS optimization map 380 can be updated accordingly. The GPS optimization map 380 may then be configured to generate a correlation between location, signal/fix quality (per satellite or in an aggregated sense for a group of signals being used for one calculation) and time that can graphically indicate areas where GPS challenges may be faced (i.e., GPS position information determined using a given set of satellites is inaccurate). The GPS optimization map 380 may sometimes also or alternatively automatically serve as a basis (e.g., as a reference document) for the optimization module 360 to reference in order to instruct the antenna 320 and/or the digital signal processor 350 of the GPS receiver 300 to handle GPS signals in a manner that ensures that the position information 370 is as accurate as possible for the current time, location, and relative position of the satellites in view for the aircraft 100.

Figure 6:
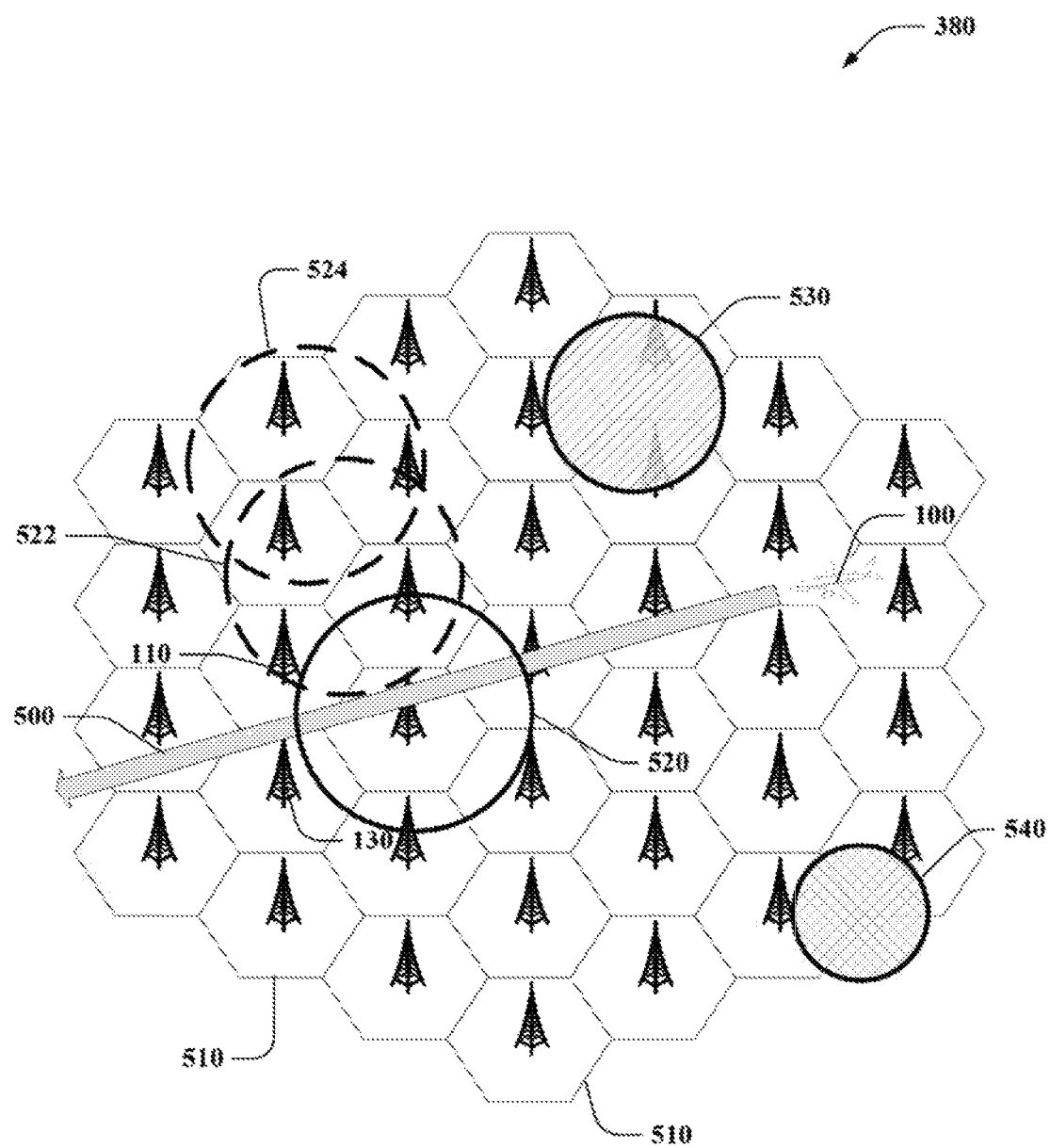
FIG. 6 illustrates a GPS optimization map in accordance with an example embodiment.

FIG. 6 illustrates an example of a GPS optimization map 380 in accordance with one example embodiment. Of note, FIG. 6 is not drawn to any kind of scale. As shown in FIG. 6, the aircraft 100 may be following a track 500 and therefore may pass through a number of coverage zones 510 of different BSs of the ATG network (e.g., first and second BSs 110 and 130). The BSs and/or the aircraft 100 may use beamforming (e.g., a beamforming control module) to form narrowly focused wireless communication links between each other based on accurate location information (of the aircraft 100 relative to known fixed locations of the BSs). Thus, it is important that the location information (which is dynamic position information indicative of a 3D location of the aircraft 100) be accurate.

As the aircraft 100 reaches zone 520, it may be determined that at least one satellite is at a zenith position relative to the aircraft 100, thereby causing any signal received from the at least one satellite to be a reflected or indirect signal. The quality of any fix (if convergence can even be achieved) may be poor, and the optimization module 360 may be configured to identify at least the area and possibly even the satellite itself. Thus, for a period of time during which the satellite would be at the zenith position relative to the zone 520 (which for GPS purposes at this time would be a blackout zone), the zone 520 would be an undesirable location at which to either rely on GPS alone, or to use the satellite that is at the zenith position. The aircraft 100 may report results associated with passing through the zone 520 to the ATG network (e.g., to an instance of the optimization module 360 at a network entity), or an instance of the optimization module 360 at the aircraft 100 may use the results to generate or update the GPS optimization map 380.

If the expected movement of the satellite is known, it may also be possible to define future zones 522 and 524 that each correspond to respective time periods where the GPS signals from the satellite will be expected to be reflected or indirect signals. Thus, another aircraft 100 passing through the area can reference an instance of the GPS optimization map 380 to determine when to use other satellites or assistance from ground stations or other assets to enhance the accuracy of position determination efforts. The GPS optimization map 380 may be configured to show different zones 530 and 540 for corresponding different satellites. Moreover, in some cases, the zones 530 and 540 may be graphically displayed with characteristics (e.g., a pattern or numerical value) that indicate a level of degradation of signals in the zone 530 or 540. Thus, the GPS optimization map 380 may provide a graphical representation of areas where GPS degradation occurs, and even a degree to which the degradation is occurring for current and/or future times. Aircraft may therefore not only submit data for inclusion in the GPS optimization map 380 when they pass through an area, but may reference the GPS optimization map 380 to preemptively take action to get the best possible location information, even in areas where GPS degradation is being experienced. Accordingly, for example, when the aircraft 100 is entering an area (e.g., zone 520, 522, 524, 530 or 540) experiencing GPS degradation on at least one satellite's signals, the aircraft 100 can avoid use of signals from that satellite (e.g., by blocking or removing signals from the degraded satellite). To improve the accuracy of position information determinations made in the area experiencing degradation, the beamforming control module of any network asset involved in communication with the aircraft 100 may supplement GPS (e.g., with ATG-based differential GPS or assisted GPS system) or use a different set of satellites for position information determination. Once the area is cleared by the aircraft 100, normal GPS usage may be restored.

Of note, in the discussion above, the primary assumption has been that GPS degradation occurs as a result of reflection off the earth in areas at a nadir relative to a satellite. However, it should also be appreciated that GPS degradation may be experienced in other areas and for other reasons. The GPS optimization map 380 may also track the occurrences of such degradations and the regions/times they occur. For example, urban canyons, GPS denial activities, spoofing of signals, or other degrading activates that occur in particular places and/or at particular times may be tracked, graphically displayed and therefore also planned for and proactively responded to by aircraft and the devices thereon in order to maximize the accuracy of dynamic position information and thereby improve the capability of steering narrow beams to and/or from the aircraft 100 for wireless communication services to devices on the aircraft 100.

As indicated above, a beamforming control module may be employed on wireless communication equipment at either or both of the network side or the aircraft side in example embodiments. Thus, in some embodiments, the beamforming control module may be implemented in a receiving station on the aircraft 100 (e.g., a passenger device or device associated with the aircraft's communication system). In some embodiments, the beamforming control module may be implemented in a network controller or at some other network side entity to provide instructions to the first BS 110 and the second BS 130 relative to beam formation/steering to enable tracking of and communication with the aircraft 100.

Figure 7:
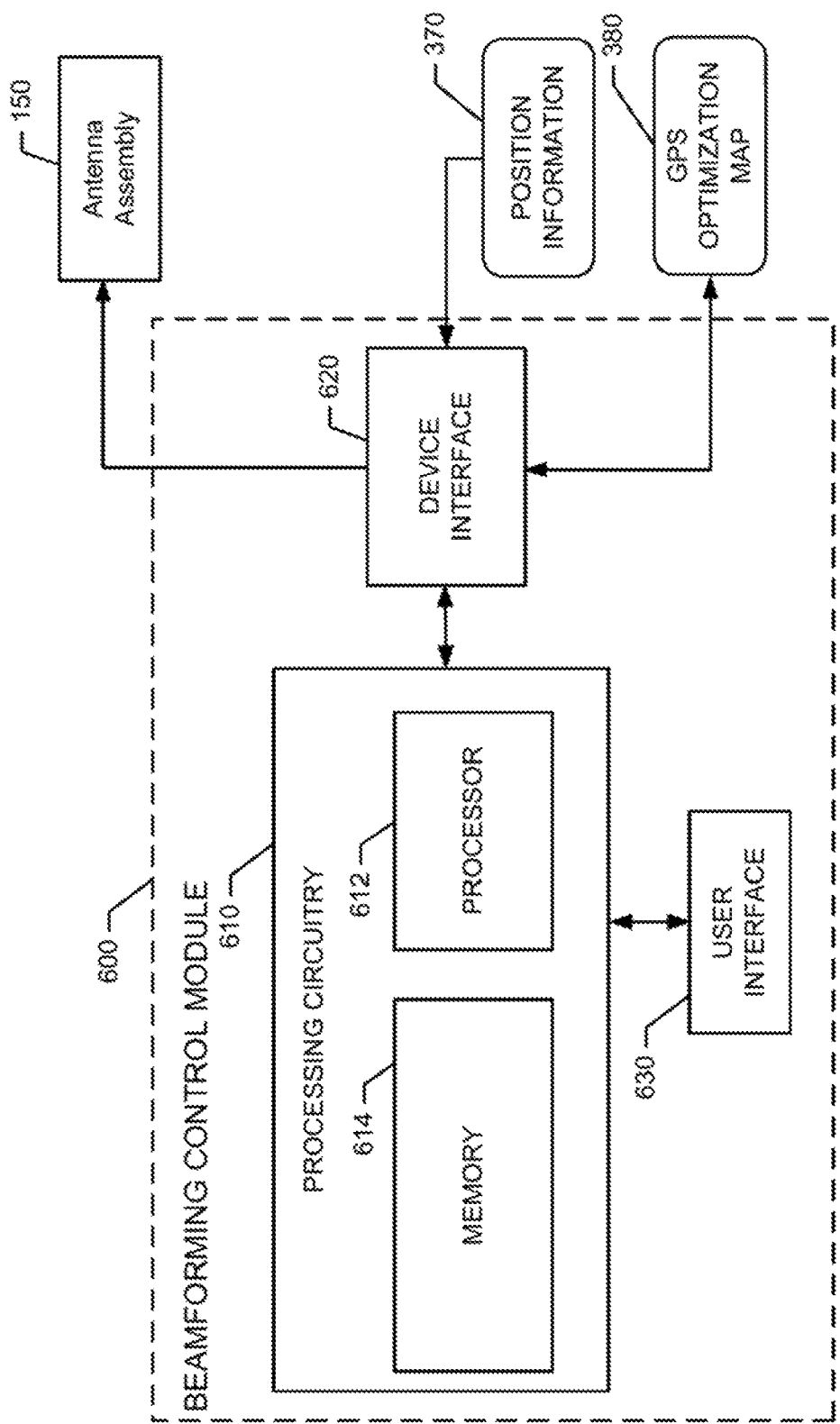
FIG. 7 illustrates a block diagram of control circuitry that may be employed to use improved quality position information for assisting with beamforming according to an example embodiment.

FIG. 7 illustrates the architecture of a beamforming control module 600 in accordance with an example embodiment. The beamforming control module 600 processing circuitry 610 configured to provide control outputs for generation of beams from an antenna array disposed at either the aircraft 100 (i.e., antenna array 150) or one of the base stations based on processing of various input information. The processing circuitry 610 may include one or more instances of a processor 612 and memory 614 that may be in communication with or otherwise control a device interface 620 and, in some cases, a user interface 630. The processing circuitry 610, processor 612, memory 614, device interface 620, and user interface 630 may be similar in capability, and perhaps also form, to the similarly named components described above. Accordingly, a repeat of the descriptions of such components will not be repeated here. However, it should be appreciated that such components, as provided in the beamforming control module 600, are configured for different respective functions and tasks, as described herein.

In this regard, for example, the processor 612 (or the processing circuitry 610) may be embodied as, include or otherwise control the operation of the beamforming control module 600 based on inputs received by the processing circuitry 610 responsive to receipt of position information 370 associated with various relative positions of the communicating elements of the network. As such, in some embodiments, the processor 612 (or the processing circuitry 610) may be said to cause each of the operations described in connection with the beamforming control module 600 in relation to adjustments to be made to antenna arrays to undertake the corresponding functionalities relating to beamforming responsive to execution of instructions or algorithms configuring the processor 612 (or processing circuitry 610) accordingly. In particular, the instructions may include instructions for processing 3D position information of a moving receiving station (e.g., on the aircraft 100) along with 2D position information of fixed transmission sites in order to instruct an antenna array to form a beam in a direction that will facilitate establishing a communication link between the moving receiving station and one of the fixed transmission stations as described herein.

In an exemplary embodiment, the memory 614 may include one or more non-transitory memory devices such as, for example, volatile and/or non-volatile memory that may be either fixed or removable. The memory 614 may be configured to store information, data, applications, instructions or the like for enabling the processing circuitry 610 to carry out various functions in accordance with exemplary embodiments of the present invention. For example, the memory 614 could be configured to buffer input data for processing by the processor 612. Additionally or alternatively, the memory 614 could be configured to store instructions for execution by the processor 612. As yet another alternative, the memory 614 may include one or more databases that may store a variety of data sets responsive to input sensors and components. Among the contents of the memory 614, applications and/or instructions may be stored for execution by the processor 612 in order to carry out the functionality associated with each respective application/instruction. In some cases, the applications may include instructions for providing inputs to control operation of the beamforming control module 600 as described herein.

In an example embodiment, the memory 614 may store fixed position information indicative of a fixed geographic location of base stations of the ATG network. In some embodiments, the fixed position information may be indicative of the fixed geographic location of multiple ones (or even all) of the base stations of the ATG network. In other embodiments, the fixed position information may be stored at another memory device either onboard the aircraft 100 or accessible to a network controller of the ATG network. However, regardless of the storage location of the fixed position information, such information may be read out of memory and provided to (and therefore also received at) the processing circuitry 610 for processing in accordance with an example embodiment.

The processing circuitry 610 may also be configured to receive dynamic position information (i.e., position information 260 or 370) indicative of a three dimensional position of at least one mobile communication station (which should be appreciated to be capable of transmission and reception of signaling in connection with two way communication). The mobile communication station may be a passenger device onboard the aircraft 100, or may be a wireless communication device of the aircraft 100 itself. The wireless communication device of the aircraft 100 may transfer information to and from passenger devices (with or without intermediate storage), or may transfer information to and from other aircraft communications equipment (with or without intermediate storage).

In an example embodiment, the processing circuitry 610 may be configured to determine an expected relative position of a first network node (e.g., one of the base station or the mobile communication station) relative to a second network node (e.g., the other one of the base station or the mobile communication station) based on the fixed position information and the dynamic position information. In other words, the processing circuitry 610 may be configured to utilize information indicative of the locations of two devices or network nodes and determine where the network nodes are relative to one another from the perspective of either one of the network nodes (or both). Tracking algorithms may be employed to track dynamic position changes and/or calculate future positions based on current location and rate and direction of movement. After the expected relative position is determined, the processing circuitry 610 may be configured to provide instructions to direct formation of a beam from an antenna array of the second network node based on the expected relative position. The instructions may be provided to a control device that is configured to adjust characteristics of an antenna array (of either the mobile communication station or the base station) to form directionally steerable beams steered in the direction of the expected relative position or to form one of a plurality of fixed beams that have particular directionality that effectively (e.g., by selection of respective adjacent beams) results in a steered beam when an aircraft is tracked using sequentially selected beams. Such "steerable" beams may, for example, have azimuth and elevation angle widths of 5 degrees or less. Moreover, in some cases, such steerable beams may have azimuth and elevation angle widths of 2 degrees or less. However, larger sized steerable beams may also be employed in some embodiments.

In an example embodiment, the first network node may be disposed at (or be) the base station, and the second network node may be disposed at the mobile communication station (e.g., the aircraft 100 or communication equipment thereon). However, alternatively, the first network node could be the mobile communication station, and the second network node could be at the base station. Furthermore, multiple instances of the beamforming control module 600 may be provided so that both the mobile communication station and the base station may employ the beamforming control module 600. Alternatively or additionally, multiple instances of the beamforming control module 600 may be provided on multiple aircraft and/or on multiple base stations so that each device (or at least multiple devices) within the ATG network may be able to direct steerable beams toward other devices in the network on the basis of using position information to estimate the relative position of a device to focus a beam toward the expected or estimated relative position.

In some embodiments, regardless of where the beamforming control module 600 is instantiated, the beamforming control module 600 may also have access to the GPS optimization map 380. The GPS optimization map 380 may, as described above, serve as a reference for the beamforming control module 600 to determine when and where GPS degradation may be experienced. Accordingly, by referencing the GPS optimization map 380, the beamforming control module 600 may be informed of the quality of the GPS position information that is being received. The beamforming control module 600 may then, in some cases, request or attempt to utilize alternative sources of data to improve the quality of the position information 370 so that beamforming can be performed in as accurate a manner as possible, as consistently as possible for both current and future calculations of beam direction.

In an example embodiment, the dynamic position information may include latitude and longitude coordinates and altitude to provide a position in 3D space. In some cases, the dynamic position information may further include heading and speed so that calculations can be made to determine, based on current location in 3D space, and the heading and speed (and perhaps also rate of change of altitude), a future location of the aircraft 100 at some future time. In some cases, flight plan information may also be used for predictive purposes to either prepare assets for future beamforming actions that are likely to be needed, or to provide planning for network asset management purposes.

Figure 8:
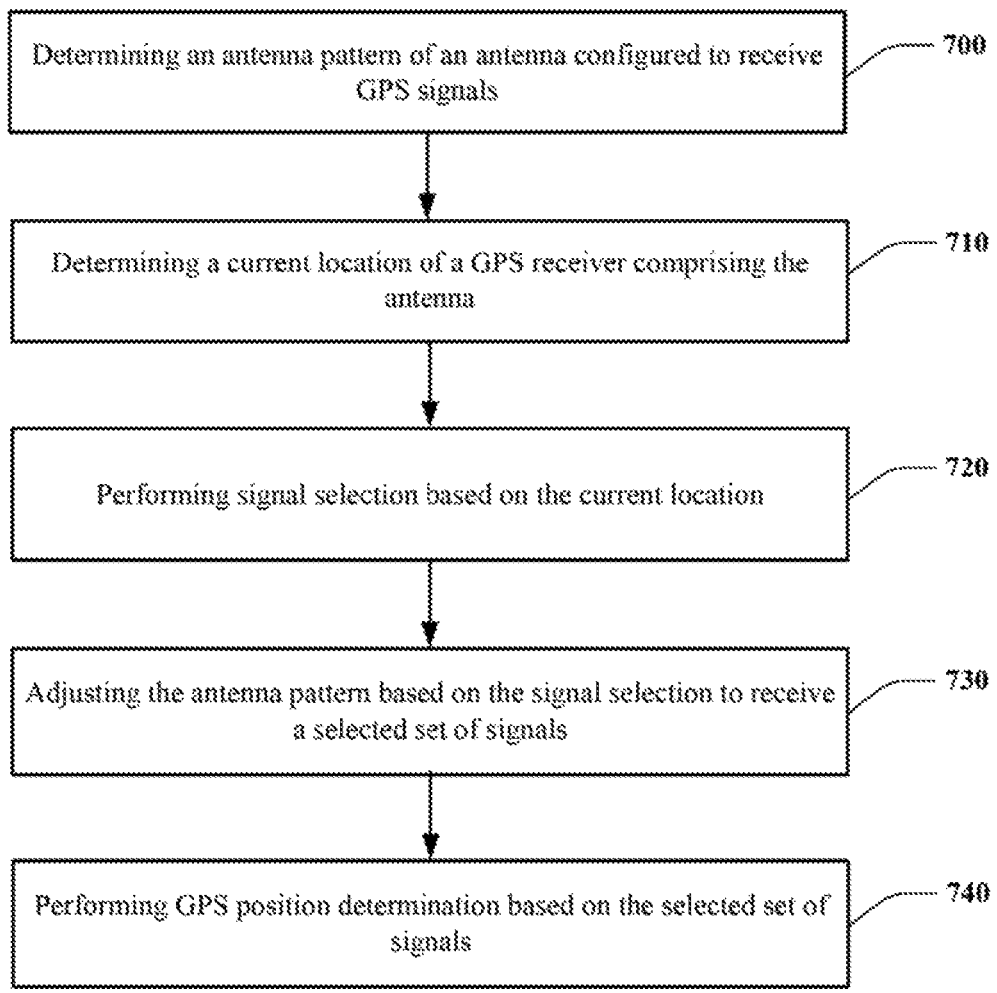
FIG. 8 illustrates a block diagram of a method for improving the quality positional information in accordance with an example embodiment.

As such, the GPS receivers 200/300 of FIG. 2 or 4 may provide an environment in which the beamforming control module 600 of FIG. 7 may provide a mechanism via which a number of useful methods may be practiced. FIG. 8 illustrates a block diagram of one method that may be associated with the GPS receivers 200/300 of FIG. 2 or 4 and the beamforming control module 600 of FIG. 7. From a technical perspective, the optimization module 360 described above may be used to support some or all of the operations described in FIG. 8. As such, the platform described in FIG. 4 may be used to facilitate the implementation of several computer program and/or network communication based interactions. As an example, FIG. 8 is a flowchart of a method and program product according to an example embodiment of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a device (e.g., a network controller, a base station, the aircraft 100, a passenger or other communication device on the aircraft 100, and/or the like) and executed by a processor in the device. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method of improving GPS position determination according to one embodiment of the invention, as shown in FIG. 8, may include determining an antenna pattern of an antenna configured to receive GPS signals at operation 700. The method may further include determining a current location of a GPS receiver comprising the antenna at operation 710 and performing signal selection based on the current location at operation 720. The method may further include adjusting the antenna pattern based on the signal selection to receive a selected set of signals at operation 730, and performing GPS position determination based on the selected set of signals at operation 740.

In some embodiments, the method (and corresponding devices that may be configured to perform the method) may include additional, optional operations, and/or the operations described above may be modified or augmented. Some examples of modifications, optional operations and augmentations are described below. It should be appreciated that the modifications, optional operations and augmentations may each be added alone, or they may be added cumulatively in any desirable combination. In an example embodiment, performing signal selection may include performing preliminary GPS position determination using multiple combinations of satellites and then scoring or ranking each combination by quality. For example, quality may be determined by fix accuracy, time to convergence of the fix determination, or other factors. Thereafter, each individual satellite used in the multiple combinations of satellites may be scored, ranked or otherwise given a quality ranking. In some cases, combinations having high rankings may include all high scoring satellites. Meanwhile, combinations with low quality ratings may be expected to have at least one satellite whose signals arrive at the GPS receiver via a reflected or indirect path. The satellite or satellites that are in multiple pairs of low scoring combinations may therefore be identified and assigned a low rank or score. Then, signals from any satellite ranked or scoring below a threshold may be blocked. Future GPS position information may then be expected to have improved accuracy. In some cases, scores for all satellites and/or combinations may be calculated the GPS optimization module 360 (which may be locally or remotely instantiated (in a consolidated or distributed architecture)). The GPS optimization module 360 may then generate a GPS optimization map as described above. It may also be possible to steer antenna beams to test specific satellites and/or situations to interrogate individual signals and determine whether they are likely reflected/indirect, or whether they are direct. The individual signals can be classified accordingly (or ranked or scored accordingly) and such information may be shared with other assets (e.g., via the GPS optimization map 380).

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A global positioning system (GPS) receiver comprising:
   an antenna configured to receive GPS signals from GPS satellites;
   a radio frequency (RF) front end configured to pre-process signals received by the antenna;
   a demodulator/converter configured to perform demodulation and analog-to-digital conversion of output signals received from the RF front end;
   a clock configured to provide a consistent clock signal;
   a digital signal processor configured to receive the clock signal and make time and code measurements associated with determining a location of the GPS receiver based on the signals received by the antenna, and
   an optimization module in communication with the digital signal processor,
   wherein the GPS receiver is configured to eliminate reflected or indirect signals from the time and code measurements, and
   wherein the optimization module is configured to alter a configuration of the antenna or operation of the digital signal processor to provide optimization of determining a location of the GPS receiver by causing elimination of the reflected or indirect signals.

2. The GPS receiver of claim 1, wherein the antenna is a directive antenna configured to form a null in a direction of the reflected or indirect signals.

3. The GPS receiver of claim 2, wherein the GPS receiver is disposed on an aircraft, and wherein the null is formed at a nadir relative to the aircraft.

4. The GPS receiver of claim 1, wherein the optimization module is configured to determine at least one satellite as a source of the reflected or indirect signals and direct configuration of the antenna to steer a null toward the source.

5. The GPS receiver of claim 1, wherein the optimization module is configured to determine at least one satellite as a source of the reflected or indirect signals and remove the reflected or indirect signals coming from the source from a set of signals being processed by the digital signal processor.

6. The GPS receiver of claim 1, wherein the optimization module is configured to determine a qualitative assessment of GPS signals received from each of the satellites.

7. The GPS receiver of claim 6, wherein the optimization module is configured to, based on the qualitative assessment, identify at least one satellite as a source of reflected or indirect signals.

8. The GPS receiver of claim 1, wherein the optimization module is configured to generate a GPS optimization map that correlates location with GPS signal quality for at least one satellite at a given time.

9. The GPS receiver of claim 1, wherein the optimization module is configured to generate a GPS optimization map that correlates location with GPS fix quality at a given time.

10. The GPS receiver of claim 1, wherein the optimization module is configured to reference a GPS optimization map that correlates location with signal or fix quality at a given time to determine one or more satellites that are likely to be a source of the reflected or indirect signals.

11. The GPS receiver of claim 1, wherein the optimization module is configured to generate a GPS optimization map that graphically displays at least one area in which a GPS signal from at least one satellite is a reflected or indirect signal.

12. The GPS receiver of claim 11, wherein the at least one area represents an area where the GPS signal from the at least one satellite is currently the reflected or indirect signal, and the GPS optimization map further graphically displays at least one additional area in which the GPS signal is expected to be reflected or indirect if received by the GPS receiver at a future time.

13. The GPS receiver of claim 1, wherein the GPS receiver is configured to eliminate reflected or indirect signals by blocking signals proximate to a nadir relative to the aircraft.

14. The GPS receiver of claim 1, wherein the GPS receiver is configured to eliminate reflected or indirect signals by being configured to receive GPS signals only from satellites disposed toward a horizon relative to the aircraft.

15. A global positioning system (GPS) receiver comprising:
   an antenna configured to receive GPS signals from GPS satellites;
   a radio frequency (RF) front end configured to pre-process signals received by the antenna;
   a demodulator/converter configured to perform demodulation and analog-to-digital conversion of output signals received from the RF front end;
   a clock configured to provide a consistent clock signal; and
   a digital signal processor configured to receive the clock signal and make time and code measurements associated with determining a location of the GPS receiver based on the signals received by the antenna,
   wherein the GPS receiver is configured to eliminate reflected or indirect signals from the time and code measurements,
   wherein the antenna is a directive antenna configured to form a null in a direction of the reflected or indirect signals,
   wherein the GPS receiver is disposed on an aircraft, and wherein the null is formed at a nadir relative to the aircraft, and
   wherein the directive antenna is formed at a bottom portion of a fuselage or wing of the aircraft, and wherein the directive antenna is configured to receive signals originating near a horizon in any direction, and reject signals originating near the nadir.

16. The GPS receiver of claim 15, further comprising an optimization module in communication with the digital signal processor,
   wherein the optimization module is configured to alter a configuration of the antenna or operation of the digital signal processor to provide optimization of determining a location of the GPS receiver by causing elimination of the reflected or indirect signals.

17. A method of improving global position system (GPS) position determination, the method comprising:
   determining an antenna pattern being employed by an antenna configured to receive GPS signals;

determining a current location of a GPS receiver comprising the antenna;
performing signal selection based on the current location;
adjusting the antenna pattern based on the signal selection to receive a selected set of signals; and
performing GPS position determination based on the selected set of signals,
wherein performing signal selection comprises:
performing preliminary GPS position determination using multiple combinations of satellites;
ranking each combination by quality;
ranking each satellite used in the multiple combinations; and
blocking signals from a satellite ranked below a threshold, and
wherein the method further comprises utilizing the ranking of each combination and/or the ranking of each satellite to generate a GPS optimization map.

* * * * *